(12) United States Patent
Kim et al.

(10) Patent No.: US 11,981,310 B2
(45) Date of Patent: May 14, 2024

(54) VEHICLE REAR WARNING SYSTEM AND CONTROL METHOD THEREOF

(71) Applicants: Hyundai Motor Company, Seoul (KR); Kia Corporation, Seoul (KR)

(72) Inventors: Jeongkyu Kim, Incheon (KR); Sangpil Kim, Gyeonggi-do (KR); Kiseok Seong, Chungcheongnam-do (KR); YouChei Sung, Gyeonggi-do (KR); Young Deok Won, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 266 days.

(21) Appl. No.: 17/454,423

(22) Filed: Nov. 10, 2021

(65) Prior Publication Data
US 2022/0314940 A1    Oct. 6, 2022

(30) Foreign Application Priority Data
Apr. 1, 2021 (KR) .................. 10-2021-0042879

(51) Int. Cl.
*B60T 7/22* (2006.01)
*B60K 35/00* (2006.01)
*B60Q 9/00* (2006.01)
*G06F 18/25* (2023.01)
*G06V 20/58* (2022.01)
*B60K 35/22* (2024.01)
*B60K 35/28* (2024.01)

(52) U.S. Cl.
CPC ................ *B60T 7/22* (2013.01); *B60K 35/00* (2013.01); *B60Q 9/008* (2013.01); *G06F 18/251* (2023.01); *G06V 20/58* (2022.01); *B60K 35/22* (2024.01); *B60K 35/28* (2024.01); *B60K 2360/171* (2024.01); *B60K 2360/178* (2024.01); *B60T 2201/022* (2013.01); *B60T 2210/32* (2013.01); *B60T 2220/04* (2013.01); *B60T 2250/00* (2013.01); *B60T 2250/04* (2013.01)

(58) Field of Classification Search
CPC .......... B60T 7/22; B60K 35/00; B60Q 9/008; G06F 18/251; G06V 20/58
See application file for complete search history.

(56) References Cited

U.S. PATENT DOCUMENTS

| | | | |
|---|---|---|---|
| 8,106,755 B1 * | 1/2012 | Knox ................... | G01S 13/867 340/439 |
| 2016/0291149 A1 * | 10/2016 | Zeng .................... | G01S 13/874 |
| 2017/0177957 A1 * | 6/2017 | Yokochi ................. | G09F 19/18 |
| 2022/0300743 A1 * | 9/2022 | Imran ................... | G01S 13/867 |

FOREIGN PATENT DOCUMENTS

KR     10-2019-0012607 A     2/2019

* cited by examiner

*Primary Examiner* — George C Jin
(74) *Attorney, Agent, or Firm* — Fox Rothschild LLP

(57) ABSTRACT

A vehicle rear warning system includes: a driving information detection portion that collects information measured from a radar and a camera sensor in a reverse mode of a vehicle; and a controller that separates a danger zone and a safe zone with reference to a fixed obstacle at a rear of the vehicle by performing fusion of the information measured from the radar and the camera in the reverse mode of the vehicle, and generates a collision event and controls warning and braking when a moving object approaching from the danger zone is detected, while limiting the warning and braking for a moving object existing in the safe zone.

18 Claims, 15 Drawing Sheets

<Warning and braking even with no risk of collision with an approaching object from behind>

<Warning and braking even with no risk of collision with wall>

<Recognize no risk of collision with approaching vehicle and limit warning and braking>

⟨Recognize no risk of collision with approaching person and limit warning and braking⟩

⟨Recognize risk of collision with approaching vehicle and generate warning and braking⟩

⟨Recognize risk of collision with approaching person and generate warning and braking⟩

⟨Derive linear regression analysis equation⟩

<Setting of danger/safe zone>

⟨Recognize no risk of collision with wall/vehicle and limit warning and braking⟩

⟨Recognize no risk of collision with approaching person and limit warning and braking⟩

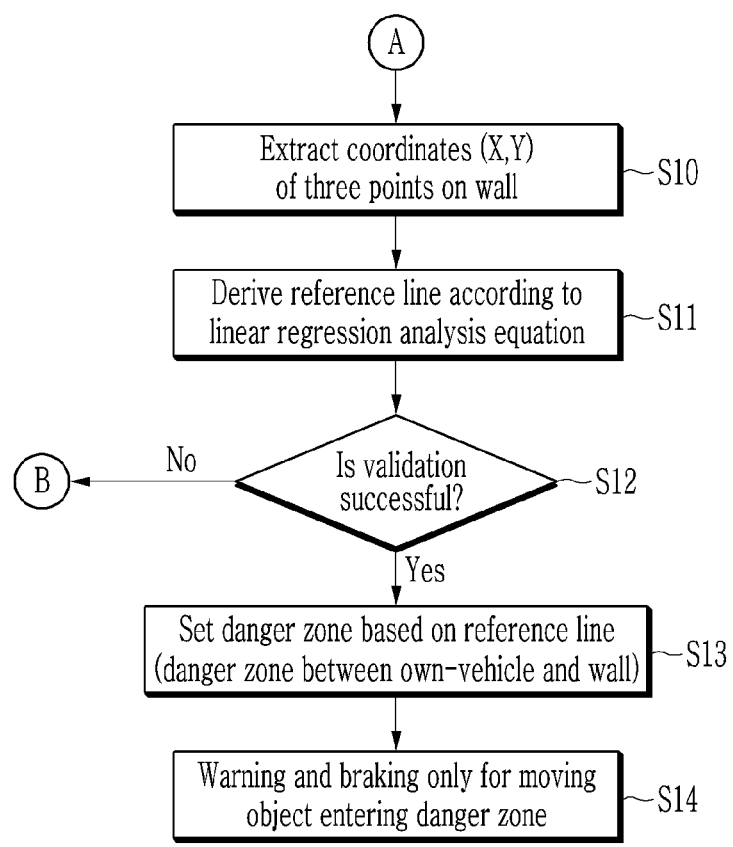

VEHICLE REAR WARNING SYSTEM AND CONTROL METHOD THEREOF

CROSS-REFERENCE TO RELATED APPLICATION

This application claims under 35 U.S.C. § 119 the benefit of Korean Patent Application No. 10-2021-0042879 filed in the Korean Intellectual Property Office on Apr. 1, 2021, the entire contents of which are incorporated herein by reference.

BACKGROUND

(a) Technical Field

The present disclosure relates to a vehicle rear warning system and a control method thereof, more particularly, to the vehicle rear warning system that warns of a rear cross-traffic collision through sensor fusion, and the control method thereof.

(b) Description of the Related Art

In general, a rear cross-traffic collision-avoidance assist (RCCA) system is applied to a vehicle as a driving assistance device that detects an object approaching from the left and right sides using radar when the vehicle is traveling in reverse and warns the driver.

FIGS. 1A-1B (RELATED ART) is a schematic view of a conventional rear cross-traffic collision-avoidance assist (RCCA) system.

Referring to FIGS. 1A and 1B, a conventional RCCA uses a radar sensor to recognize a relative position and relative speed of a moving object (e.g., a vehicle/person) approaching from the rear side when the vehicle is traveling in reverse. When a collision with an object is predicted, a warning is given to the driver and braking is generated to avoid the collision.

However, as shown in FIG. 1A, when a fixed obstacle is positioned at the rear of the vehicle and an object approaches from behind the obstacle, unnecessarily sensitive warning and braking are generated due to the performance limit situation of the radar even though there is no risk of collision.

In addition, as shown in FIG. 1B, when the vehicle is reversing, if there is a wall of a reflective material at the rear, it may cause unnecessary warning and braking due to misrecognition (also called ghost recognition/phenomenon) due to a radar signal or light reflection even in a situation where there is no risk of collision with another vehicle passing in front.

That is, the conventional RCCA has a problem of causing confusion to the driver or deterioration of the reliability of the warning function by sensitively triggering warning and braking control due to the limitation of the sensor even in a situation where there is no risk of collision of the vehicle.

The above information disclosed in this Background section is only for enhancement of understanding of the background of the disclosure, and therefore it may contain information that does not form the prior art that is already known in this country to a person of ordinary skill in the art.

SUMMARY

An embodiment of the present disclosure provides a vehicle rear warning system that prevents unnecessarily sensitive operation of a rear collision warning by separating a rear danger zone and a safety zone through fusion of an autonomous driving sensor applied to the vehicle, and a control method thereof.

According to one aspect of the present disclosure, a vehicle rear warning system includes: a driving information detection portion that collects information measured from a radar and a camera sensor in a reverse mode of the vehicle; and a controller that separates a danger zone and a safe zone with reference to a fixed obstacle at the rear by performing fusion of the information measured from the radar and the camera in the reverse mode of the vehicle, and generates a collision event and controls warning and braking when a moving object approaching from the danger zone is detected, while limiting the warning and braking for a moving object existing in the safe zone.

In addition, the vehicle rear warning system may further include: a braking portion that generates a braking force to wheels according to a control signal applied from the controller; a warning portion that warns a driver of a rear collision event of the vehicle and displays a braking state accordingly; and a storing portion that matches and stores reference coordinates for measuring coordinates of an object with reference to the vehicle through the radar and the camera.

In addition, the driving information detection portion may detect driving information measured from at least one of the radar, the camera, a vehicle speed sensor, an accelerator position sensor, a brake pedal sensor, or a transmission position sensor according to the operation of the vehicle.

In addition, the radar may include a program and a control module of the program to predict an expected collision time and a collision point by analyzing a position, a distance, and a moving direction of the vehicle and the moving object.

In addition, the camera may recognize a fixed obstacle installed on a road and a wall of a building by photographing a rear image when the vehicle is in the reverse mod.

In addition, the controller may extract coordinates of fixed obstacles when three or more fixed obstacles are recognized through the camera to derive the reference line using a linear regression analysis.

In addition, the controller may extract obstacle coordinates selected in a certain range or a certain number of both sides around an axle among the recognized fixed obstacles.

In addition, the controller may create an equation of a straight line that connects two points of coordinates, positioned at the leftmost side among the selected obstacle coordinates, and coordinates, positioned at the rightmost side, and may generate a linear regression analysis equation through the equation.

In addition, the controller may perform validation to determine whether an error between the coordinates of the fixed obstacle positioned in the middle among the coordinates of the fixed obstacles and the reference line satisfies an allowable distance, and then separate each region when the validation succeeds.

In addition, the controller may separate the danger zone in the inner direction where the vehicle is located and the safe zone in the opposite outer direction with the reference line when the fixed obstacle is an object.

In addition, when a wall is recognized by the camera, the controller may extract the coordinates of at least 3 points along the length direction of the wall and derive the reference line according to linear regression analysis.

In addition, the controller may establish a danger zone in a direction inside the vehicle from the wall relative to the reference line.

A control method of a vehicle rear warning system that warns a rear cross-traffic collision through sensor fusion according to one aspect of the present disclosure, includes steps of: a) detecting a fixed obstacle or a wall positioned at the rear by performing fusion of information collected from a radar and a camera in a reverse mode of a vehicle; b) extracting coordinates with respect to at least three points through the radar when the number of the fixed obstacles satisfies 3 or more; c) deriving a reference line according to linear regression analysis using the extracted coordinates and separating a danger zone and a safe zone based on the reference line; and d) generating a collision event to control warning and braking when a moving object approaching from the danger area is detected, but limiting an occurrence of the collision event for a moving object existing in the safe zone.

In addition, step b) may include maintaining an existing rear cross collision warning (RCCA) logic when the number of the fixed obstacles is less than three.

In addition, step c) may include performing validation whether an error between the reference line and the fixed obstacle coordinates meets within an allowable distance.

In addition, the performing validation may include: when an error of intermediate obstacle coordinates except for the two obstacle coordinates at both ends in the reference line does meet the allowable distance, determining that the validation is successful and separating each zone; or when the error of the intermediate obstacle coordinates does not meet the allowable distance, determining that validation has failed and maintaining an existing RCCA logic.

In addition, wherein the intermediate obstacle coordinates may be measured by using the camera.

In addition, step b) may include extracting coordinates of at least three points along a length direction of a wall when the wall is detected.

In addition, the control method of the vehicle rear warning system may further include, after step b): setting a danger zone in an inner direction where the vehicle is positioned from the wall based on the reference line; and generating a collision event only to a moving object entering the danger zone to control warning to a driver and vehicle braking and limiting generation of a collision event according to ghosting due to reflection of light from the wall.

According to the embodiment of the present disclosure, it is possible to prevent unnecessarily sensitive operation by separating a danger zone and a safety zone based on a position of a fixed obstacle and limiting the warning and braking control for moving objects that do not exist in the safety zone and have no collision risk in the reverse mode of the vehicle.

In addition, it is possible to secure reliability and safety by recognizing a situation in which a moving object suddenly enters a danger zone from a safe zone with a low probability of collision by determining the directionality of the moving object and performing warning and braking control.

In addition, the present disclosure provides the effect of securing optimized performance by recognizing the type of a rear obstacle, an error caused by ghosting when a vehicle approaches the front when the wall is positioned behind the vehicle, and generating a warning and braking only in necessary situations to warn of rear cross collision.

BRIEF DESCRIPTION OF THE DRAWINGS

FIGS. 8 and 9 are flowcharts showing a vehicle rear warning system control method according to an embodiment of the present disclosure.

DETAILED DESCRIPTION OF THE EMBODIMENTS

Figure 1A:
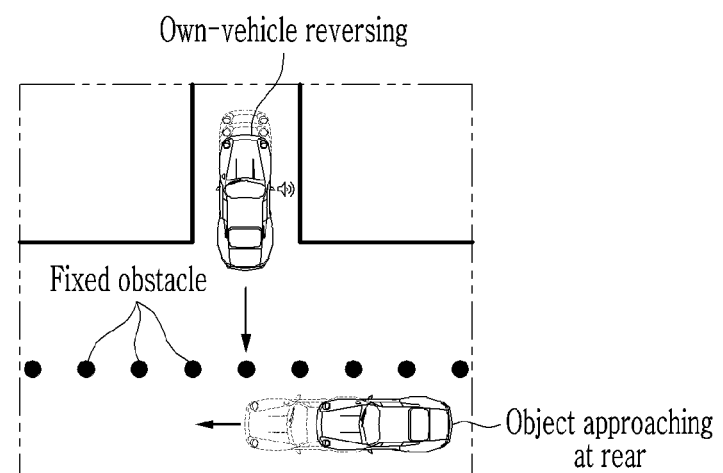
FIGS. 1A-1B (RELATED ART) are schematic view of a conventional rear cross-traffic collision-avoidance assist (RCCA) system.
Figure 1A:
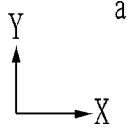
Figure 1B:
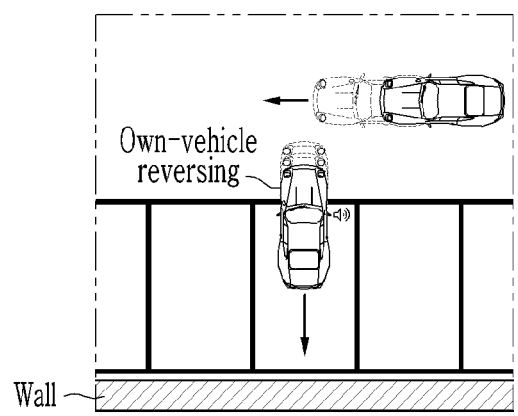
Figure 1B:
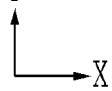

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, terms such as first, second, A, B, (a), (b), and the like may be used to describe various configurations and elements, but the constituent elements should not be limited by the terms. Such a term is only for distinguishing one constituent element from other constituent elements, and the essence, sequence, or order of the constituent element is not limited by the term.

Throughout the specification, when it is mentioned that a certain constituent element is "connected to" or "accesses" another constituent element, it may be directly connected or connected to the other constituent element, but it should be understood that there may be another constituent element exists therebetween. On the other hand, when it is mentioned that a certain constituent element is "directly connected to" or "directly accesses" another constituent element, it should be understood that another constituent element does not exist therebetween.

Throughout the specification, the terminology used is only used to describe a particular embodiment, and is not intended to limit the present disclosure. Expressions in the singular include a plural expression unless the context clearly dictates otherwise.

Unless otherwise defined in this specification, all terms used herein, including technical or scientific terms, have the same meaning as commonly understood by a person of ordinary skill in the technical field in which the present disclosure is included. Terms such as those defined in a generally-used dictionary should be interpreted as being consistent with the contextual meaning of the related technology, and unless explicitly defined in this specification, they are not to be interpreted with an idealized or excessively formal meaning.

Hereinafter, with reference to the drawing for a vehicle rear warning system and a control method thereof according to an embodiment of the present disclosure will be described in detail.

Figure 2:
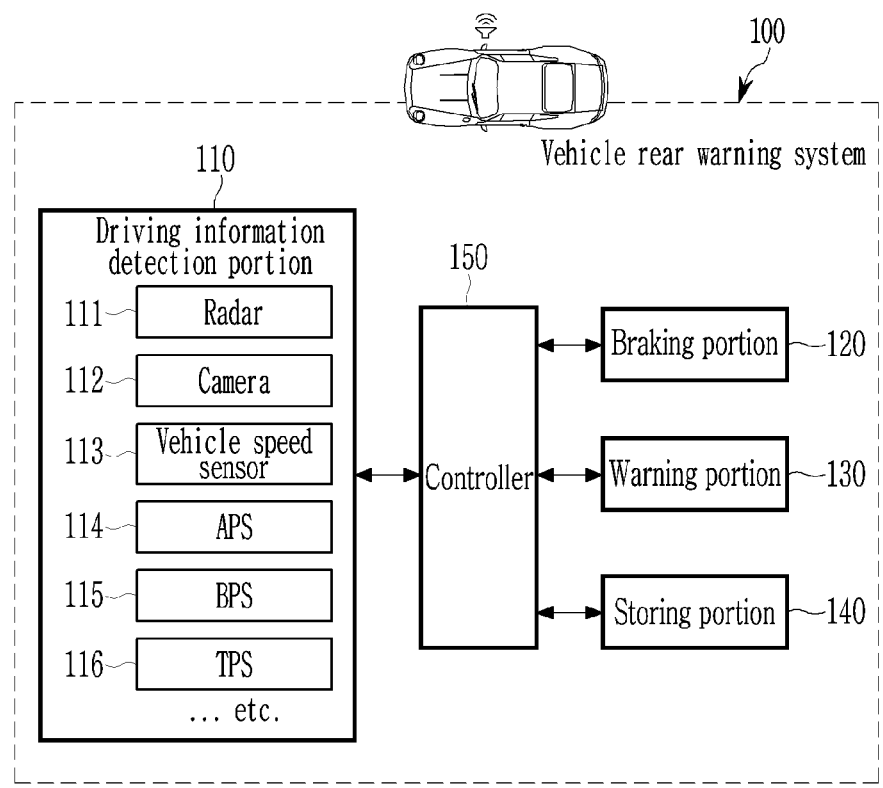
FIG. 2 schematically illustrates configurations of a vehicle rear warning system according to an embodiment of the present disclosure.

FIG. 2 schematically illustrates configurations of a vehicle rear warning system according to an embodiment of the present disclosure.

Referring to FIG. 2, a vehicle rear warning system 100 according to an embodiment of the present disclosure includes a driving information detection portion 110, a braking portion 120, a warning portion 130, a storing portion 140, and a controller 150. In addition, the vehicle rear warning system 100 may further include an autonomous driving sensor such as LiDAR. Hereinafter, when classification of the vehicle is necessary in the description, a vehicle to which the rear warning system 100 according to the embodiment of the present disclosure is applied may be referred to as "own-vehicle", and vehicles other than the own-vehicle may be referred to as "other-vehicle", but when the classification is not required, it may be collectively referred to as a vehicle.

The driving information detection portion 110 detects various driving information required for rear collision warning control of the vehicle from various sensors and controllers according to the operation of the vehicle and transmits the detected information to the controller 150. The rear collision warning control as provided herein incorporates improvements that address problems of the existing rear cross-traffic collision-avoidance assist (RCCA).

For example, the driving information detection portion 110 may detect driving information measured from at least one of a radar 111, a camera 112, a vehicle speed sensor 113, an accelerator position sensor (APS) 114, a brake pedal sensor (BPS) 115, or a transmission position sensor (TPS) 116 according to the operation of the vehicle. Here, the operation of the vehicle may include an autonomous driving mode, an autonomous parking mode, and a manual driving mode.

The radar 111 is installed on the rear left and right sides of the vehicle, respectively, to irradiate the radar at a predetermined angle, and to detect a relative position (coordinates), a distance, and a moving direction of the object according to a reflected signal. Hereinafter, depending on whether the object is mobile, a fixed object is called an obstacle, and a mobile object is called a moving object. For example, the obstacle may be an object fixed to a road, such as safety bars and signs on the road, or a wall of a building blocked by a vertical plane, and the moving object may be a vehicle, a person, or an animal.

In addition, the radar 111 may include a program and its control module to predict an expected collision time and a collision point by analyzing a position, a distance, and a moving direction of the own-vehicle and the moving object.

The camera 112 recognizes a fixed obstacle by photographing a rear image when the vehicle is in reversing mode. In this case, the camera 112 can recognize obstacles such as safety bars and signs on the road, and walls or structures of buildings blocked by vertical surfaces and their coordinates through image recognition technology.

The APS 114 measures a state of accelerator pedal operation and the amount of change thereof according to the driver's operation and autonomous driving.

The BPS 115 measures a state of brake pedal operation and the amount of change thereof according to driver operation and autonomous driving.

The TPS 116 detects the vehicle's reverse (R stage) status according to the driver's shift stage operation and autonomous driving.

The braking portion 120 generates a braking force to each wheel of the vehicle in response to a control signal applied as one of functions of an advanced driver assistance system (ADAS) or an autonomous driving system. For example, the braking portion 120 is configured as an electronic stability control (ESC) and may generate a braking force to each wheel according to the control signal.

The warning portion 130 displays various information generated according to the operation of the vehicle rear warning system 100 to the driver through at least one of visual, auditory, and tactile means.

The warning portion 130 may warn of a rear cross collision when a rear collision event of the vehicle occurs and display a braking mode operation state accordingly.

For example, the warning portion 130 may display a visual and auditory warning through AVN, a cluster, HUD, and the like, and may tactilely express by vibration of a handle.

The storing portion 140 stores various programs and data for operation of the vehicle rear warning system 100 according to the embodiment of the present disclosure, and stores data generated according to the operation.

The storing portion 140 matches and stores a reference coordinate system for measuring coordinates of an object with respect to the vehicle through the radar 111 and the camera 112, respectively. That is, the storing portion 140 may calibrate the coordinates of the objects (fixed obstacles, walls, and moving objects) measured using autonomous driving sensors such as the radar 111 and the camera 112, and furthermore, a LiDAR to match within a permissible error range based on the position of the own-vehicle.

The controller 150 is an integrated electronic control unit that controls the overall operation of each part for the operation of the vehicle rear warning system 100 according to the embodiment of the present disclosure.

The controller 150 may centrally control the actual operation of each part according to execution of the program and data stored in the storing portion 140, or may interwork with it.

The controller 150 collects real-time driving information through the driving information detection portion 110 while the vehicle is running, and identifies that the vehicle has entered the reverse mode.

The controller 150 identifies fixed obstacles positioned at the rear by performing fusion of information measured from the radar 111 and the camera 112 when the vehicle is in the reverse mode, and separates the danger zone and the safe area based on the fixed obstacle. In addition, when the object approaching from the danger zone is detected, the controller 150 generates a collision event and controls the warning and braking, but limits the warning and braking for a moving object existing in the safe zone to prevent unnecessarily sensitive operation of the conventional rear collision warning.

The controller 150 distinguishes a case where the obstacle at the rear recognized by the camera 112 is a fixed object and a case of a wall, derives a reference line according to linear regression analysis with a plurality of obstacle coordinates extracted through the radar 111, and sets a danger zone and a safe area according to the derived reference line.

A method for setting the respective areas in the case that the obstacle at the rear is a fixed object will now be described with reference to FIGS. 3A-3B, 4A-4B, and 5A-5B.

Figure 3A:
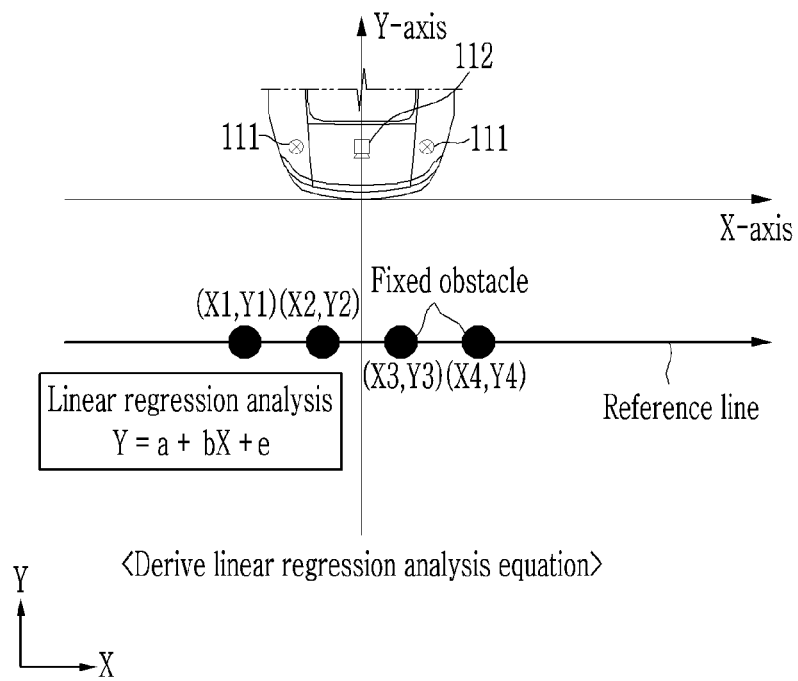
FIGS. 3A-3B show a method for predetermining a danger zone and a safe zone in the case that a rear side obstacle is a fixed object according to a first embodiment of the present disclosure.
Figure 3B:
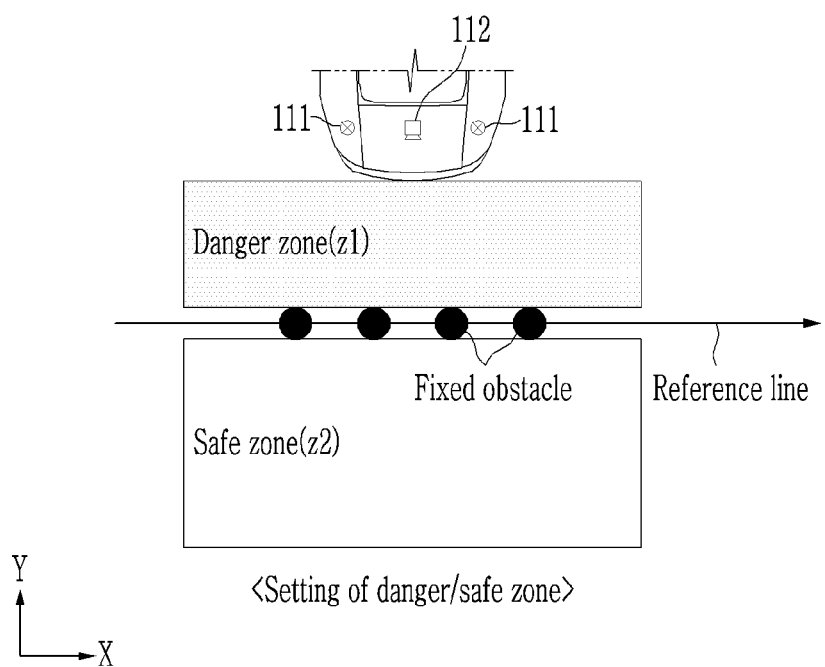

FIGS. 3A-3B depict a method for setting a danger zone and a safe area in the case that the obstacle at the rear is a fixed object according to the first embodiment of the present disclosure.

FIGS. 4A-4B and 5A-5B show cases of no warning and warning when the rear obstacle is an object according to the first embodiment of the present disclosure.

FIGS. 3A-3B, 4A-4B, and 5A-5B show a case that the controller 150 of the vehicle rear warning system 100 separates a danger zone z1 and a safe area z2 with reference to the reference line derived according to the linear regression analysis when the fixed obstacle at the rear of the vehicle, recognized by the camera 112 of the linear regression analysis.

Since the controller 150 uses the linear regression analysis to separate each area, there must be at least 3 fixed obstacles (objects). For example, the fixed obstacle may be a plurality of safety rods disposed in the length direction to induce safe driving on the road.

The controller 150 extracts the coordinates for the 3 or more fixed obstacles based on the information measured by the radar 111.

Figure 4A:
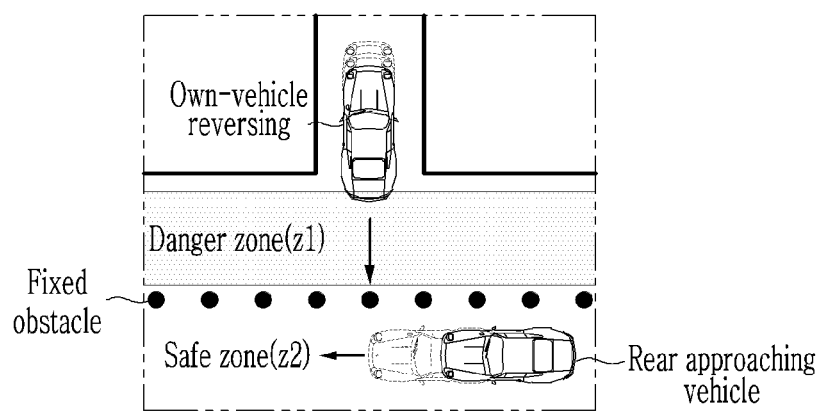
FIGS. 4A-4B and 5A-5B show cases of no warning and warning when the rear obstacle is an object according to the first embodiment of the present disclosure.
Figure 4A:
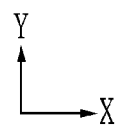
Figure 4B:
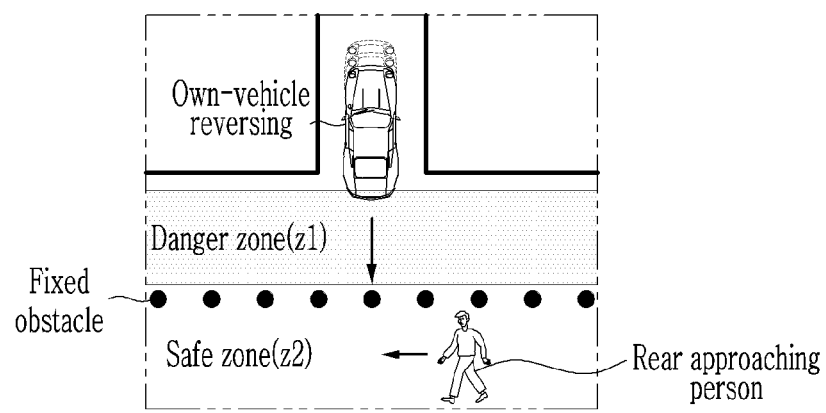
Figure 4B:
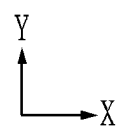

Referring to FIGS. 4A-4B, the controller 150 may extract obstacle coordinates (X, Y) selected in a certain range or a certain number of both sides around the axle when the number of recognized safety rods is large. In this case, the selected obstacle coordinates (X, Y) are defined as first coordinates to fourth coordinates according to the order.

The controller 150 creates an equation of a straight line that connects two points of the first coordinates X1 and Y1, positioned at the leftmost side among the selected obstacle coordinates, and the fourth coordinates X4 and Y4, positioned at the rightmost side, and generates a linear regression analysis equation as given in Equation 1 through the equation.

In this case, the controller 150 derives a hypothetical reference line according to the generation of the linear regression analysis equation, and separates the danger zone z1 in the inner direction with the own-vehicle and the safe zone z2 in the outer direction opposite to the own-vehicle based on the reference line. That is, the danger zone z1 between the own-vehicle and the reference line according to the fixed obstacle is set as the safe zone z2, and the area opposite the reference line and the own-vehicle is set as the safe zone z2.

$$\text{Linear regression analysis equation} = Y = a + bX + e \quad \text{(Equation 1)}$$

(Here, y denotes a dependent variable, x denotes an independent variable, a denotes an intercept, b denotes a slope, and e denotes a residual, and the residual e may be calculated through Equation 2 using a least squares estimator.)

$$e = yi - \hat{y}i, 8 = 1, 2, \ldots n \quad \text{(Equation 2)}$$

Meanwhile, the reference line is a very important factor that determines the danger zone z1 and the safe zone z2, and therefore, the controller 150 proceeds with validation to ensure safety.

Thus, the controller 150 validates whether an error of the fixed obstacle coordinates deviating from the reference line is within an allowable distance, and then when the validation is successful, the controller 150 separates each area.

For example, the controller 150 determines that the coordinates are valid when the error of the coordinates of any one intermediate obstacle (e.g., second or third obstacle) except for the two fixed obstacle coordinates (e.g., first and fourth obstacles) at both ends of the reference line is included in the allowable distance, and separates each area. Here, the reference line is derived based on the coordinates of three or more fixed obstacles measured by the radar 111, the intermediate obstacle coordinates may be measured using the camera 112, and may be validated through such a sensor fusion.

Therefore, as shown in FIGS. 4A-4B, the controller 150 recognizes that there is no risk of collision when a moving object (vehicle/person) is in the safe area z2 outside the fixed obstacle (reference line) even through the moving object approaches the own-vehicle in the reverse mode, to thereby prevent (limit) warning and braking.

Figure 5A:
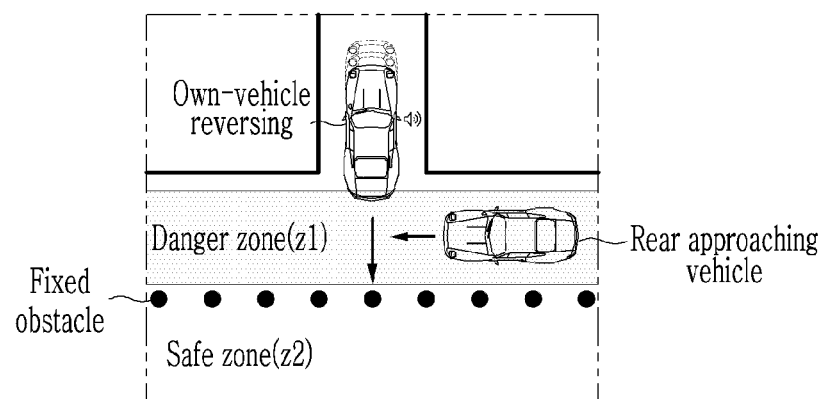
Figure 5A:
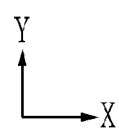
Figure 5B:
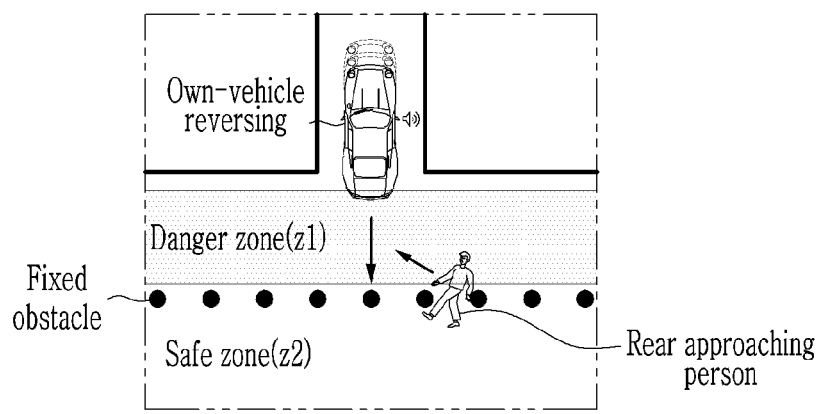
Figure 5B:
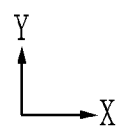

On the contrary, as shown in FIGS. 5A-5B, the controller 150 measures the moving speed and direction of a moving object (vehicle/person) behind the own-vehicle in the reverse mode, and recognizes and warns of a dangerous situation suddenly occurring in the danger zone z1 from the safe zone z2 with low probability of collision, thereby assuring reliability and safety by performing warning and braking control.

However, when the error of the intermediate obstacle coordinates is not included (i.e., exceeds) within the allowable distance based on the reference line, the controller 150 does not separate the respective areas and maintains the existing rear cross-collision warning (RCCA) logic. That is, when the validation of the reference line according to the linear regression equation is not satisfied, the existing conservative (sensitive) RCCA logic can be maintained for safety. That is, when the approach of the moving object is recognized in the reverse mode, warning and braking may be generated without limitation.

Meanwhile, a method for predetermining a danger zone when a rear obstacle is a wall according to a second embodiment of the present disclosure is a wall will be described with reference to FIGS. 6A-6B and 7A-7B, and descriptions that are similar to the first embodiment will be omitted.

Figure 6A:
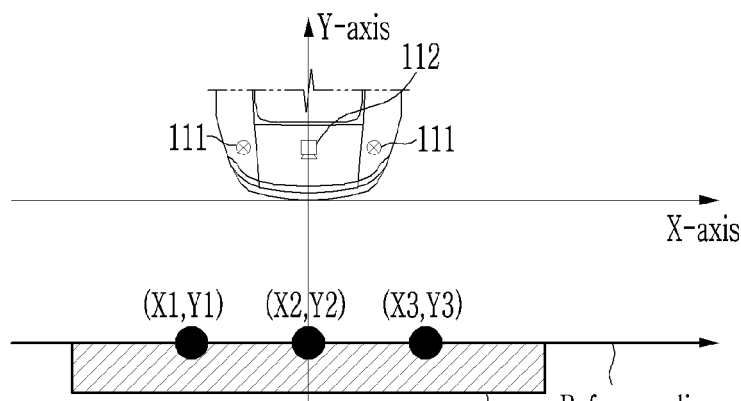
FIGS. 6A-6B show a method for predetermining a danger zone when a rear obstacle is a wall according to a second embodiment of the present disclosure.
Figure 6A:
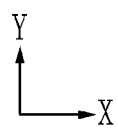
Figure 6B:
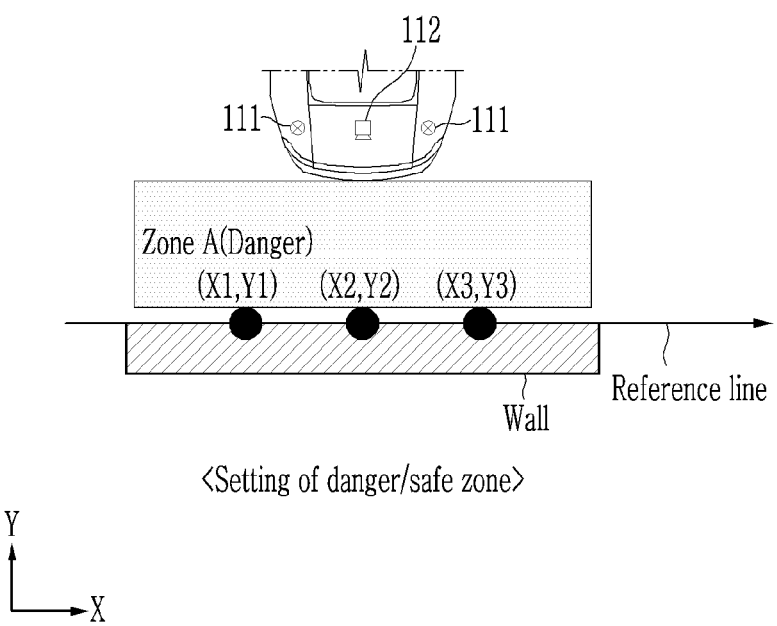

FIGS. 6A-6B show a method for predetermining a danger zone when a rear obstacle is a wall according to a second embodiment of the present disclosure.

Figure 7A:
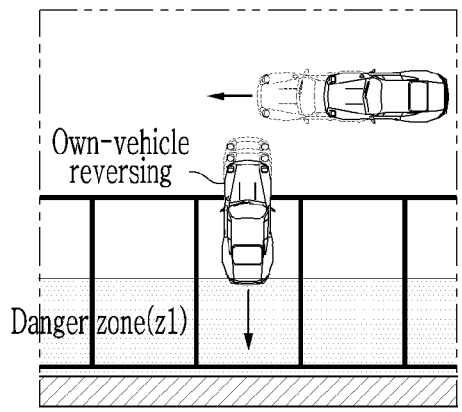
FIGS. 7A-7B shows cases of no warning and warning when the rear obstacle is a wall according to the second embodiment of the present disclosure.
Figure 7B:
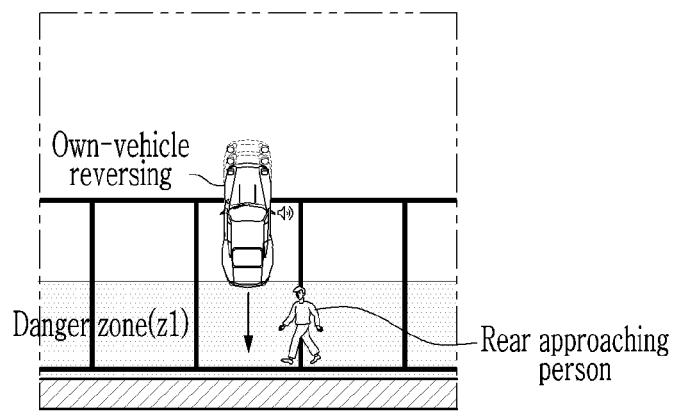

FIGS. 7A-7B show cases of no warning and warning when the rear obstacle is a wall according to the second embodiment of the present disclosure.

Referring to FIGS. 6A-6B and 7A-7B, when a rear fixed obstacle recognized by a camera 112 of a controller 150 of a vehicle rear warning system 100 is a wall, a predetermined danger zone z1 is set based on the reference line derived from the linear regression analysis.

Since a controller 150 separates each region based on the reference line using the linear regression analysis, the controller 150 extracts the coordinates of at least three points along the length direction of the wall. Hereinafter, the coordinates of the three points may be defined as first coordinates or third coordinates, respectively, according to the arrangement order.

The controller 150 generates a linear regression analysis equation that connects two points of the first coordinates X1 and Y1 positioned at the left most and the third coordinates X3 and Y3 positioned at the rightmost position among the coordinates of the three points, and derives a hypothetical reference line according to the generation of the linear regression analysis equation.

When the controller 150 succeeds in validating the reference line, the controller 150 sets a danger zone z1 in the inner direction with an own-vehicle from the wall based on the reference line.

Thus, as shown in FIG. 7, the controller 150 recognizes that there is no risk of collision with the wall and other vehicles without ghosting even through another vehicle passes in front and if there is a wall at the rear when the own-vehicle is in the reverse mode, thereby preventing (limiting) generation of warning and braking.

In addition, the controller 150 recognizes that there is a risk of collision when a moving object (vehicle/person) at the rear approaches in the danger zone z1 set inside with reference to the fixed obstacle (reference line) and approaches the own-vehicle in the reverse mode, such that warning and braking are generated.

Such a controller 150 may be implemented with at least one processor operating according to a predetermined program, and the predetermined program may be programmed to perform each step of the vehicle rear warning system control method according to the embodiment of the present disclosure.

Such a vehicle rear warning system control method will be described with reference to FIGS. 8 and 9, and the controller 150 is a constituent element included in the vehicle rear warning system 100, such that the system will be mainly described.

Figure 8:
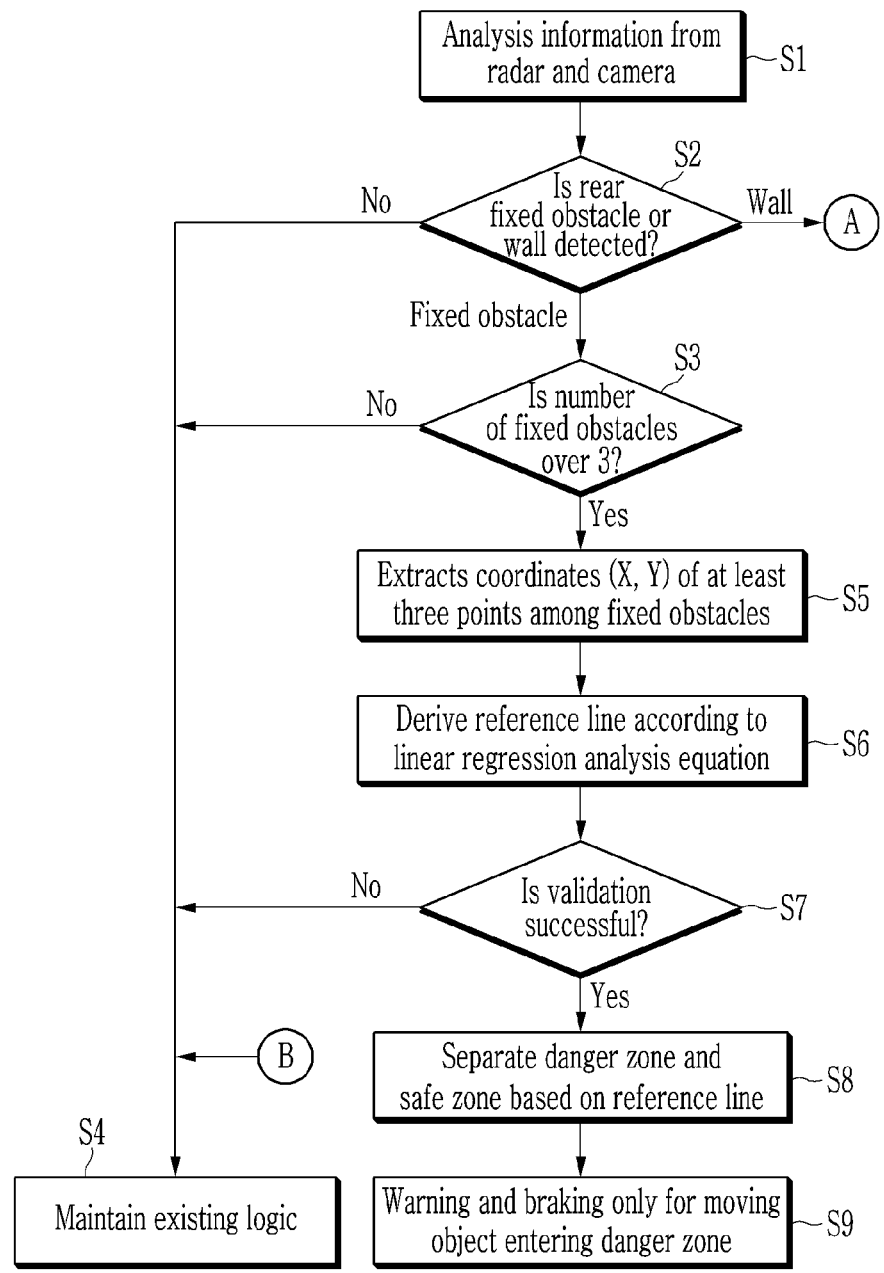

FIGS. 8 and 9 are flowcharts showing a vehicle rear warning system control method according to an embodiment of the present disclosure.

Referring to FIGS. 8 and 9, a vehicle rear warning system control method according to an embodiment of the present disclosure will be described assuming a state in which a vehicle rear warning system 100 collects real-time driving information through a driving information detection portion 110 while the vehicle is driving and recognizes that it has entered a reverse mode.

The vehicle rear warning system 100 detects a fixed obstacle or wall positioned at the rear by a fusion analysis of information from a radar 111 and a camera 112 collected from driving information of the vehicle in the reverse mode (S1 and S2).

In this case, when the fixed obstacle is detected (S2: fixed obstacle), the vehicle rear warning system 100 determines the number of fixed obstacles, and when the number of the fixed obstacles is less than 3 (S3: No), the vehicle rear warning system 100 performs an existing RCCA logic (S4).

On the other hand, when the number of the fixed obstacles is at least 3 (S3: Yes), the vehicle rear warning system 100 extracts coordinates (X and Y) with respect to the at least three points among the fixed obstacles (S5).

The vehicle rear warning system 100 derives a reference line according to a linear regression equation using the extracted coordinates and validates whether an error between the reference line and the fixed obstacle coordinates is within an allowable distance (S7).

In this case, the vehicle rear warning system 100 determines that validation has failed when an error of an intermediate obstacle coordinates except for the two obstacle coordinates at both ends in the reference line does not meet the allowable distance (S7; No), and performs the existing RCCA logic (S4).

On the other hand, when the error of the intermediate obstacle coordinates except for the two obstacle coordinates at both ends in the reference line meets the allowable distance, the vehicle rear warning system 100 determines that validation is successful (S7; Yes), and separates a danger zone z1 in the inner direction with the own-vehicle and a safe zone z2 in the outer direction opposite the own-vehicle based on the reference line (S8).

In addition, the vehicle rear warning system 100 generates a collision event only for moving objects that have entered the danger zone z1 to warn a driver and control vehicle braking, while limiting the warning and braking with respect to moving objects existing in the safe zone z1 (S9).

Meanwhile, in S2, when the wall is detected (S2: wall), the vehicle rear warning system 100 extracts coordinates of at least three points along the length direction of the wall (S10).

The vehicle rear warning system 100 derives a reference line according to the linear regression equation using the extracted coordinates and validates whether an error between the reference line and actual coordinates extracted from the wall S11 is included within the allowable distance (S12).

In this case, the vehicle rear warning system 100 determines that validation has failed when the error of the coordinates of the intermediate obstacle except for the two points at both ends does not meet within the allowable distance based on the reference line (S12; No), and performs the existing RCCA logic (S4).

On the other hand, the vehicle rear warning system 100 determines that validation has succeeded when the error of the coordinates of the intermediate obstacle does meet within the allowable distance based on the reference line (S12; Yes), and sets a danger zone z1 in an inner direction where the own-vehicle exists (S13).

In addition, the vehicle rear warning system 100 generates a collision event only for moving objects that enter the danger zone z1 between the own-vehicle and the wall to warn the driver and control vehicle braking and limit warning and braking due to ghosting (S14).

As described, according to the embodiment of the present disclosure, in the reverse mode of the vehicle, the danger zone and the safe zone are separated based on the position of the fixed obstacle, and warning and braking control are limited with respect to a moving obstacle that exists in the safe zone and thus does not face the collision risk, to thereby prevent unnecessarily sensitive operation.

In addition, there is an effect of ensuring safety by recognizing a situation in which a moving object suddenly enters a danger area from a safe area with a low probability of collision by determining the directionality of the moving object and performing warning and braking control.

In addition, an error caused by the ghost phenomenon in a case that the vehicle approaches the front in a situation that a wall is positioned behind the own-vehicle can be eliminated by recognizing the type of rear obstacle, and warning and braking are generated only in necessary situations to warn of rear cross collision, thereby optimizing performance.

Hereinabove, the embodiments of the present disclosure have been described, but the present disclosure is not limited to the above embodiments and various other modifications are possible.

For example, in the above-described embodiment of the present disclosure, the rear cross-collision warning function that is improved through sensor fusion using the radar 111 and the camera 112 is provided, but the embodiment of the present disclosure is not limited thereto, and can be implemented through a sensor fusion using the LiDAR and the camera 112.

That is, the vehicle rear warning system 100 may also extract coordinates of at least three points measured using a LiDAR, sets a danger zone z1 and a safe zone z2 based on a reference line according to a linear regression equation, and limit sensitive warning with respect to a moving object sensed in the safe zone z2.

Therefore, there is an advantage in that it is possible to provide an effective vehicle rear warning system and a control method thereof only by modifying the autonomous driving sensor and software applied to the vehicle without configuring additional parts or hardware.

In addition, in the embodiments of the present disclosure described above, when three or more fixed obstacles are recognized through the camera, each coordinate is extracted and the reference line is derived according to linear regression analysis. This is one preferred embodiment considering that safety rods on the road are usually disposed side by side. Therefore, the present disclosure is not limited thereto, and the controller may derive a reference line according to non-linear regression analysis when three or more obstacles are recognized through the camera.

The embodiments of the present disclosure are not only implemented only through the device and/or method described above, but also implemented through a program for realizing a function corresponding to the configuration of an embodiment of the present disclosure, a recording medium in which the program is recorded, and the like, and such an implementation can be easily implemented by an expert in the technical field to which the present disclosure belongs from the description of the embodiment described above.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A vehicle rear warning system, comprising:
    a driving information detection portion that collects information measured from a radar and a camera sensor in a reverse mode of a vehicle;
    a controller that separates a danger zone and a safe zone with reference to a fixed obstacle at a rear of the vehicle by performing fusion of the information measured from the radar and the camera in the reverse mode of the vehicle, and generates a collision event and controls warning and braking when a moving object approaching from the danger zone is detected, while limiting the warning and braking for the moving object existing in the safe zone;
    a braking portion that generates a braking force to wheels according to a control signal applied from the controller;
    a warning portion that warns a driver of a rear collision event of the vehicle and displays a braking state accordingly; and
    a storing portion that matches and stores reference coordinates for measuring coordinates of an object with reference to the vehicle through the radar and the camera.

2. The vehicle rear warning system of claim 1, wherein:
    the driving information detection portion detects driving information measured from at least one of the radar, the camera, a vehicle speed sensor, an accelerator position sensor, a brake pedal sensor, or a transmission position sensor according to the operation of the vehicle.

3. The vehicle rear warning system of claim 1, wherein:
    the radar includes a program and a control module of the program to predict an expected collision time and a collision point by analyzing a position, a distance, and a moving direction of the vehicle and the moving object.

4. The vehicle rear warning system of claim 1, wherein:
    the camera recognizes a fixed obstacle installed on a road and a wall of a building by photographing a rear image when the vehicle is in the reverse mode.

5. The vehicle rear warning system of claim 1, wherein:
    the controller extracts coordinates of fixed obstacles when three or more fixed obstacles are recognized through the camera to derive a reference line using a linear regression analysis.

6. The vehicle rear warning system of claim 5, wherein:
    the controller extracts obstacle coordinates selected in a certain range or a certain number of both sides around an axle among the recognized fixed obstacles.

7. The vehicle rear warning system of claim 6, wherein:
    the controller creates an equation of a straight line that connects two points of coordinates positioned at a leftmost side among the selected obstacle coordinates, and coordinates positioned at a rightmost side, and generates a linear regression analysis equation through the equation.

8. The vehicle rear warning system of claim 7, wherein:
    the controller performs validation to determine whether an error between the coordinates of the fixed obstacle positioned in a middle among the coordinates of the fixed obstacles and the reference line satisfies an allowable distance, and then separates each region when the validation succeeds.

9. The vehicle rear warning system of claim 5, wherein:
the controller separates the danger zone in an inner direction where the vehicle is located and the safe zone in an opposite outer direction with the reference line when the fixed obstacle is an object.

10. The vehicle rear warning system of claim 5, wherein:
when a wall is recognized by the camera, the controller extracts the coordinates of at least 3 points along a length direction of the wall and derives the reference line according to linear regression analysis.

11. The vehicle rear warning system of claim 10, wherein:
the controller establishes a danger zone in a direction inside the vehicle from the wall relative to the reference line.

12. A control method of a vehicle rear warning system that provides a warning of a rear cross-traffic collision through sensor fusion, the control method comprising the steps of:
a) detecting a fixed obstacle or a wall positioned at the rear by performing fusion of information collected from a radar and a camera in a reverse mode of a vehicle;
b) extracting coordinates with respect to at least three points through the radar when the number of the fixed obstacles satisfies 3 or more;
c) deriving a reference line according to linear regression analysis using the extracted coordinates and separating a danger zone and a safe zone based on the reference line; and
d) generating a collision event to control warning and braking when a moving object approaching from the danger area is detected, but limiting an occurrence of the collision event for a moving object existing in the safe zone.

13. The control method of the vehicle rear warning system of claim 12, wherein:
step b) comprises maintaining an existing rear cross collision warning (RCCA) logic when the number of the fixed obstacles is less than three.

14. The control method of the vehicle rear warning system of claim 12, wherein:
step c) comprises performing validation whether an error between the reference line and the fixed obstacle coordinates meets within an allowable distance.

15. The control method of the vehicle rear warning system of claim 14, wherein the performing validation comprises:
when an error of intermediate obstacle coordinates except for the two obstacle coordinates at both ends in the reference line does meet the allowable distance, determining that the validation is successful and separating each zone; or
when the error of the intermediate obstacle coordinates does not meet the allowable distance, determining that validation has failed and maintaining an existing RCCA logic.

16. The control method of the vehicle rear warning system of claim 15, wherein the intermediate obstacle coordinates are measured by using the camera.

17. The control method of the vehicle rear warning system of claim 12, wherein:
step b) comprises extracting coordinates of at least three points along a length direction of a wall when the wall is detected.

18. The control method of the vehicle rear warning system of claim 17, comprising:
after step b),
setting a danger zone in an inner direction where the vehicle is positioned from the wall based on the reference line; and
generating a collision event only to a moving object entering the danger zone to control warning to a driver and vehicle braking and limiting generation of a collision event according to ghosting due to reflection of light from the wall.

\* \* \* \* \*